United States Patent

Rantalainen

[11] Patent Number: 5,543,608
[45] Date of Patent: Aug. 6, 1996

[54] METHOD AND THE SYSTEM FOR IDENTIFYING A VISUAL OBJECT WITH A POLARIZING MARKER

[76] Inventor: Erkki Rantalainen, Kaatmäentie, SF-52300 Ristiina, Finland

[21] Appl. No.: 402,771

[22] Filed: Mar. 9, 1995

Related U.S. Application Data

[63] Continuation of Ser. No. 78,270, fled as PCT/F191/00390, Dec. 16, 1991, published as WO92/11607, Jul. 9, 1992, abandoned.

[30] Foreign Application Priority Data

Dec. 17, 1990 [FI] Finland ................................ 906225

[51] Int. Cl.⁶ ................................................. G06K 7/10
[52] U.S. Cl. .................. 235/454; 235/457; 235/491; 283/85; 283/90; 348/25; 250/225
[58] Field of Search ...................... 235/454, 457, 235/491; 348/25; 382/8, 48; 356/71, 364, 367, 369; 283/85, 90; 250/225

[56] References Cited

U.S. PATENT DOCUMENTS

| H515 | 8/1988 | Holt | 348/25 |
|---|---|---|---|
| 3,313,941 | 4/1967 | Marks | 250/219 |
| 3,443,072 | 6/1969 | Mori | 235/61.11 |
| 3,800,282 | 3/1974 | Acker | 340/146.3 |
| 3,801,775 | 4/1974 | Acker | 235/61.11 |
| 3,871,771 | 3/1975 | Scott | 356/364 |
| 3,873,207 | 3/1975 | Bryngdahl | 356/366 X |
| 3,992,571 | 11/1976 | Garlick et al. | 348/29 |
| 4,034,211 | 5/1977 | Horst et al. | 235/61.12 |
| 4,042,302 | 8/1977 | Wentz | 356/364 X |
| 4,544,836 | 10/1985 | Galvin et al. | 235/487 |
| 4,638,171 | 1/1987 | Gassman | 250/566 |
| 4,906,829 | 3/1990 | Iseli | 235/454 |
| 4,924,078 | 5/1990 | Sant'Anselmo et al. | 235/494 |
| 5,082,365 | 1/1992 | Kuzmick et al. | 356/390 X |

FOREIGN PATENT DOCUMENTS

8801080  11/1988  WIPO.

Primary Examiner—Donald T. Hajec
Assistant Examiner—Michael G. Lee
Attorney, Agent, or Firm—Merchant, Gould, Smith, Edell, Welter & Schmidt, P.A.

[57] ABSTRACT

An identifying procedure and system for identifying a visual object, the object to be identified (1) being marked with a polarizing surface (2) provided in the region of the object. Observation of the object is accomplished by utilizing the lighting prevailing at the object and in its ambience, on the basis of the polarized light (4a) reflected by said polarizing surface.

30 Claims, 1 Drawing Sheet

METHOD AND THE SYSTEM FOR IDENTIFYING A VISUAL OBJECT WITH A POLARIZING MARKER this is a File Wrapper Continuation application of application Ser. No. 08/078,270, filed as PCT/FI91/00390, Dec. 16, 1991, published as WO92/11607, Jul. 9, 1992, now abandoned.

BACKGROUND OF THE INVENTION

The present invention concerns an identifying procedure for identifying a visual object and an identifying system for observing and identifying a visual object.

Automatic identification of a visual object or mark is difficult owing to the abundance of signals. The location and attitude of the object to be identified are not always known in advance. The object may be partly covered with dirt or the like, so that observation of the object and, for instance, aiming and focussing a camera or equivalent serving as identifier, on the object to be identified is impossible, or difficult at least.

SUMMARY OF THE INVENTION

The object of the invention is to eliminate the drawbacks mentioned. It is particularly an object of the invention to enable locating and identifying of various visual objects in a reliable, accurate and rapid manner even if the object should be located far away.

Regarding the features which are characteristic of the invention, reference is made to the claims section.

In the identifying procedure of the invention the object to be identified is marked with at least one polarizing surface area provided either on the object or in conjunction with the object, i.e., in the region, or vicinity, of the object, observation of the object being accomplished with the aid of polarized light reflected by the polarizing surface. It is thus understood that observation of the object takes place, in the invention, by utilizing the illumination present at the object and in its ambience, on the basis of polarized light coming from the polarizing surface. Since no similar polarized light exists inherently in nature, the polarized light emitted by the surfaces serving as markers is easy to distinguish from other ambient light and radiation. As taught by the invention, the polarizing surfaces act merely as locators of the object that is to be identified.

Advantageously in the procedure of the invention, a polarized surface is placed in the vicinity of the object to be identified, so that the positioning of the polarizing surface and of the object to be identified is known, in which case when the easily observable polarizing surface is first found, the object meant to be identified can also be located with its aid.

Since polarizing surface coatings do not alter the appearance of an object, one may upon the object to be identified attach a transparent polarizing film which supplies the information needed in the locating process, while identification of the object itself is accomplished in another way. It should be noted, however, that at a location with black background no polarization can be discerned because a black area reflects no radiation whatsoever.

If the object to be examined may present itself in arbitrary attitude relative to the identifying apparatus, it will be advantageous to use a polarizer producing light with circular polarization. The attitude and inclination of the object can be found by calculation if the polarized area is made asymmetric, e.g. in the shape of a letter L. It is then possible from the image to calculate the true attitude relative to the identifier from the ratio of the side lengths and from the angle between the sides and, if desired, to rotate the object in the image into normal position.

The attitude of the object can also be determined if the object is marked with two different-handed circular polarizers which are positioned in known manner relative to the object.

If the size of the object is known, the distance of the object can be calculated with the aid of the angle of view. The object may itself carry information on the object's size.

If the object is far away, or if the image of the object is small for any other reason, it is conceivable that both polarized light and unpolarized light from an adjacent area impinge on one surface element in the identifying apparatus. The identifying apparatus will then identify the light falling on such an area as partly polarized. It is then possible to examine such a location by zooming on it, and to check whether there is an object in the area.

It is advantageous to use for image identifying means a camera in which the image is formed at two separate locations so that the light which is horizontally polarized relative to the camera and that which is vertically polarized thereto are directed to go to separate images. If the object is marked with circular polarizers, the circularly polarized light is converted to linearly polarized light prior to its division into separate images. This conversion can be accomplished with a suitable delay element, such as a lambda/4 plate for instance, which is placed under a suitable angle relative to the camera. It is possible by comparing, in the images, the luminance values of equivalent points to find the polarized areas, if any, and the object to be identified can be observed. The object may also be transferred to a monitor or recorded for later scrutiny.

The visual object-identifying system of the invention comprises appropriate image identifying means, for which suitable cameras, for instance may be used. As taught by the invention, the system comprises a polarizing surface, or several surfaces, of known shape and with known polarizing characteristics, placed in the region of the object to be identified. Furthermore, in the system the image identifying means are incorporated in an identifying apparatus, which, if required, includes a suitable delay element for converting circularly polarized light to linearly polarized light, and a divider means by which the incoming light is divided into two parts in accordance with its direction of polarization.

For divider, a crystal is advantageously used which has a division interface admitting light with a given direction of polarization to pass through but reflecting any light which is polarized at right angles against the first direction. It is also feasible to use for divider, a birefringent crystal or a semi-transparent mirror in conjunction with which polarization filters are provided.

If the camera which is employed handles a two-dimensional image, the object can be observed and identified with one single exposure even if the image should be two-dimensional and even if it should present itself with arbitrary attitude.

If the camera only handles a one-dimensional image, it is advantageous to use a one-dimensional object on which the information has been encoded in bar code fashion. The polarized area is positioned in a line with the code. When the identifier apparatus observes a polarized area, the code itself is also readable in the same image. If the attitude of the object is not known in advance, the code may be composed of concentric rings, and the polarizing area used as detector is placed in the centre of the area. When the identifying apparatus observes a polarized area, the code will be found in the image on either side of the polarized area. In order to bring the object into the image, it may be necessary to move either the object or the identifying apparatus.

The procedure and system of the invention may be used in the following applications, among others.

Various traffic signs and signals used in road traffic can be marked with a suitable polarizing surface, whereby they can be automatically recorded with appropriate instruments and displayed in a suitable manner and at a suitable occasion e.g. before the driver's eyes. Speed limits, for instance may be automatically recorded by an apparatus provided in the vehicle, where they can be looked up when needed.

Another potential application of the invention is marking pieces and goods in automated production, transport and storage. In storage operations, when the objects to be stored are marked with codes, such code markings as are used may be encircled, or otherwise marked, with polarizing surfaces so that they are easy to observe, and to record, with automatic identifying apparatus, even from great distance. Likewise, the system is applicable e.g. in goods transport in recording the flow of wagons and case goods, and in production plants in recording and directing the products moving on production lines.

The invention may also be applied in determining the location and/or attitude of a body, or of another equivalent object. The body is marked with a polarizing surface, or surfaces, placed in known manner relative to the body. As soon as the location and attitude of the polarizing surface have been found, the location and attitude of the body itself can also be determined.

With the aid of observations which are consecutive in time, the quantities associated with a body's state of motion can be found, such as its velocity, acceleration, speed of rotation, etc.

The advantage afforded by the procedure and system of the invention over the state of art is simple, fast and accurate automatic observation and identification of various objects, signs, codes, signals and equivalent. Since the analysis is made within one image frame, any proper movement of the object exerts an influence only within the limits of the time of exposure.

The invention differs from the methods of prior art in that the object is marked with a polarizing surface, or surfaces, and the identifying apparatus analyses the sector of space in front of it, searching for polarized areas therein. As soon as a polarized area or areas have been observed, the location and attitude of the object are known on the basis thereof. Identification of the object itself thereafter takes place otherwise than on the basis of polarization. In connection with the identification system, aimed lighting may be used in order to increase the lighting intensity, but no scanning beam is required for identification. In other words, it is not necessary in the system of the invention to hunt for polarizing surfaces or objects in presumed areas by means of light beams which go through, or sweep, such areas; instead, the general illumination prevailing in the space under observation, such as natural light outdoors, is enough for the system of the invention to find in this space any completely polarized light and, on its basis, the object to be identified.

Electromagnetic radiation with a wavelength shorter or longer than that of visible light may equally be used to observe and identify the object.

Also elements other than a polarizing plate or sheet may be used towards marking the object: for instance, a plate or sheet reflecting or transmitting only certain given wavelengths from the radiation. The marker plate/sheet can then be distinguished from the ambience at large with the aid of the spectrum coming from the plate/sheet. Different wavelengths are directed to go to different images in the identifier. This is accomplished either in that a divider means divides the radiation on the basis of wavelength, or in that filters are used after the divider.

BRIEF DESCRIPTION OF THE DRAWINGS

In the following the invention is described in detail with reference to the attached drawing, wherein.

DETAILED DESCRIPTION OF THE PREFERRED EMBODIMENT

Figure 1:
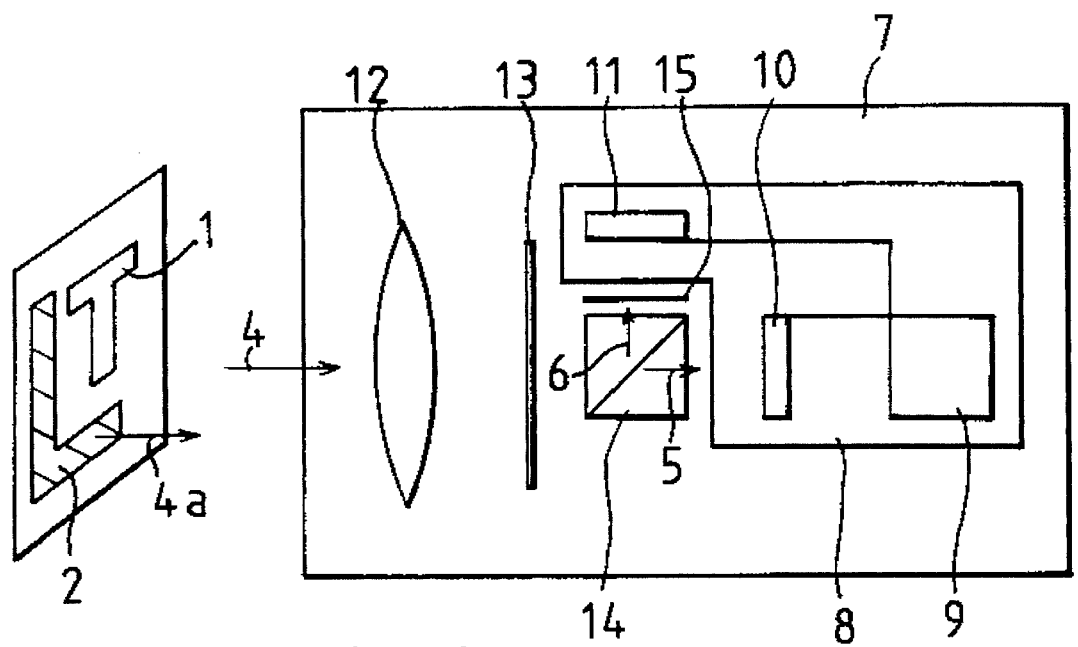
FIG. 1 presents, schematically, an identifying system according to the invention.

The visual object-identifying system depicted in FIG. 1 comprises an identifying apparatus 7 including an image identifying means 8 consisting of an analyzer 9 and image surfaces 10 and 11. The light 4 incident on the apparatus is after the objective 12 directed to a crystal 14 provided with a dividing interface and serving as divider means, where the vertically polarized component 5 and the horizontally polarized component 6 of the incident light 4 are separated. The images are formed on the image surfaces 10 and 11.

In the vicinity of the object 1 a letter L-shaped polarizing surface 2 has been placed.

The system according to the invention is operated as follows. When one desires to find and identify the object 1, it is observed with the aid of the polarized light 4a emitted by the polarizing surface 2, because no such light normally occurs in nature. In order that the object 1 could be identified with ease and accuracy, its direction and attitude must be discovered. Since the object 1 which shall be identified is known to be in a certain position relative to the polarizing surface 2, definition of the exact location and attitude of the polarizing surface is enough. This is accomplished as follows.

On the image surfaces 10 and 11 of the identifying apparatus 7 two images of the space sector in front of the identifying apparatus are formed. One image is produced by the horizontal and the other by the vertical component of the light incident on the divider. If the object is marked with a circularly polarizing surface, the circularly polarizes light must prior to the divider be converted to linearly polarized light. This is accomplished e.g. with a lambda/4 plate 13 in appropriate position.

When there is an object marked with a polarized area in front of the identifier, the two images differ at the location of the polarized area so that the luminosity is significantly higher in one image than in the other. If only one kind of polarizer plate/sheet is used, the brighter image of the polarized area will always be seen on one and the same image surface. The search for the polarized area can be simplified, and interference can be reduced, by placing an attenuator 15 before the respective image surface. Suitable for use as attenuator is a polarizer plate; the strength of attenuation can then be regulated by rotating the plate. The power of the attenuator is adjusted to be such that at the locations of polarized areas the points of said image surface are brighter than the equivalent points on the other image surface, while at any other location the image is less bright than in the other image.

The attitude and shape of the polarized area on the image surface are then found by comparing luminosity values at equivalent points in both images.

When furthermore the true shape of the polarizing surface 2 is known, it becomes possible with the aid of the length ratios and angles in the projection image to determine the attitude of the object and its inclination against the direction of observation. The image obtained from the image surface of the camera can be converted to its normal position by calculation. The object 1 to be identified is thereafter easy to record and to identify. If the size of the object is known, its distance can be calculated. Or, if the distance is known, the size can be calculated.

Figure 2:
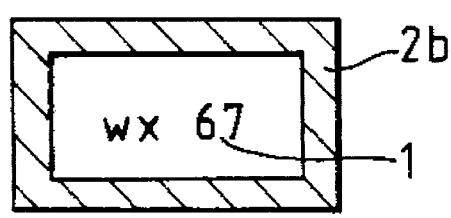
FIG. 2 presents a practical application of the invention.

In FIG. 2 is depicted another embodiment of the invention wherein the object 1 to be identified, a suitable code of letters or numerals, is encircled with a polarizing surface 2b. Hereby the polarizing surface delimits from a larger area a sharply defined area in which the code that is being used is rather easy to read with the aid of conventional image identifying means.

Figure 3:
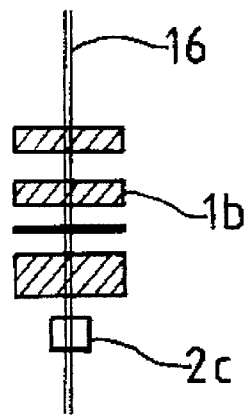
FIG. 3 illustrates a practical application of the invention in which the task is to identify a one-dimensional code with known attitude.

In FIG. 3 is shown an example of an embodiment in which the object to be identified is a one-dimensional code 1b in known attitude. The polarizer 2c has been placed in a line with the code, in front of the initial end of the code. The object is easy to observe and to identify with an identifier handling a one-dimensional image. When there is an image of the space slice 16 on the image surfaces of the identifier, the polarization is observed, and the code can be interpreted at the moment.

Figure 4:
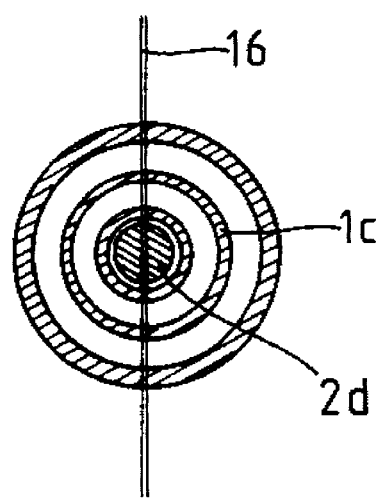
FIG. 4 illustrates an application in which the task is to identify a one-dimensional code with arbitrary attitude.

In FIG. 4 is seen an example of an embodiment in which the task is to identify a one-dimensional code with arbitrary attitude. The code is represented by concentric rings 1c. The polarizer 2d is placed in the centre of these rings. When there is an image of the strip 16 in the camera, the code is found on either side of the polarized area.

In the search for a one-dimensional code which has been coded in a line with known attitude or in the form of concentric rings, the amount of light incident on the image surfaces of the identifier can be augmented by reducing the image formed in the identifier, in the direction perpendicular against the space slice.

In the foregoing the invention has been described by way of example with the aid of the attached drawings, while different embodiments of the invention are conceivable within the scope of the inventive idea delimited by the claims.

I claim:

1. A method of locating and identifying an ordinarily visible object which is located at an arbitrary location and attitude, comprising the steps of:

providing a marker having a polarizing surface reflecting a polarizing light without an aid of a polarizing light source, the marker with the polarizing surface being disposed in a vicinity of the ordinarily visible object so that a mutual positioning of the polarizing surface and the ordinarily visible object is known;

observing and analyzing the polarized light reflected from the marker so that an existence, location and attitude of the marker is found;

locating the arbitrary location and attitude of the object in the vicinity of the marker based on said mutual positioning; and identifying the object.

2. A method according to claim 1, wherein the polarizing surface has an asymmetric shape.

3. A method according to claim 2, wherein the attitude of the object is identified by the asymmetric shape of the polarizing surface.

4. A method according to claim 1, wherein the polarizing surface has a plurality of different polarizing properties.

5. A method according to claim 4, wherein the attitude of the object is identified by the different polarizing properties of the polarizing surface.

6. A method according to claim 1, wherein a distance between an image identifying means and the object is identified by a size of the polarizing surface.

7. A method according to claim 1, wherein an image identifying means includes an identifier, vertically and horizontally polarized components of the emitted polarizing light from the marker incident on the identifier being separated into at least two separate images, comparison of said two separate images being performed to observe the polarizing light.

8. A method according to claim 1, wherein if at first only partially polarizing light is observed, a respective location of the polarizing light is zoomed in and an examination is made to determine whether there is any completely polarizing light in the respective location.

9. A method according to claim 1, wherein with an aid of observations consecutive in time, quantities associated with the object state of motion are found.

10. A method of locating and identifying an ordinarily visible object which is located at an arbitrary location and attitude, comprising the steps of:

providing a marker having a polarizing surface reflecting a polarizing light without an aid of a polarizing light source, the marker with the polarizing surface being disposed on the ordinarily visible object, observing and analyzing the polarized light reflected from the marker so that an existence, location and attitude of the marker and the object under the marker is found; and identifying the object.

11. A method according to claim 10, wherein the polarizing surface of the marker is placed to cover the object at least partly.

12. A method according to claim 9, wherein the polarizing surface has an asymmetric shape.

13. A method according to claim 12, wherein the attitude of the object is identified by the asymmetric shape of the polarizing surface.

14. A method according to claim 10, wherein the polarizing surface has a plurality of different polarizing properties.

15. A method according to claim 14, wherein the attitude of the object is identified by the different polarizing properties of the polarizing surface.

16. A method according to claim 10, wherein a distance between an image identifying means and the object is identified by a size of the polarizing surface.

17. A method according to claim 10, wherein an image identifying means includes an identifier, vertically and horizontally polarized components of the emitted polarizing light from the marker incident on the identifier being separated into at least two separate images, comparison of said two separate images being performed to observe the polarizing light.

18. A method according to claim 10, wherein if at first only partially polarizing light is observed, a respective location of the polarizing light is zoomed in and an examination is made to determine whether there is any completely polarizing light in the respective location.

19. A method according to claim 10, wherein with an aid of observations consecutive in time, quantities associated with the object state of motion are found.

20. A method of locating and identifying an ordinarily visible object which is located at an arbitrary location and attitude, comprising the steps of:

providing a marker having a surface reflecting an electromagnetic radiation with a spectrum different from an ambient radiation, the marker being disposed in a vicinity of the ordinarily visible object so that a mutual positioning of the marker and the ordinarily visible object is known;

observing and analyzing the electromagnetic radiation reflected from the marker so that an existence, location and attitude of the marker is found;

locating the arbitrary location and attitude of the object in the vicinity of the marker based on said mutual positioning; and identifying the object.

21. A method of locating and identifying an ordinarily visible object which is located at an arbitrary location and attitude, comprising the steps of:

providing a marker having a surface reflecting an electromagnetic radiation with spectrum different from an ambient radiation, the marker being disposed on the ordinarily visible object;

observing and analyzing the electromagnetic radiation reflected from the marker so that an existence, location and attitude of the marker and the object under the marker is found; and identifying the object.

22. A system for locating and identifying an ordinarily visible object which is located at an arbitrary location and attitude, comprising:

a marker having a polarizing surface disposed in a vicinity of the object to be located and identified, the polarizing surface reflecting a polarizing light without an aid of a polarizing light source, a mutual positioning of the polarizing surface and the ordinarily visible object being known;

an identifying apparatus including:
divider means for dividing incoming light into two parts on a basis of polarization so that the polarizing light reflecting from the polarizing surface of the marker is detected; and
analyzer for analyzing the detected polarizing light to locate the arbitrary location and attitude of the object based on said mutual positioning, and to identify the object.

23. An identifying system according to claim 22, wherein the polarizing light is circularly polarized, the system further comprising a delay element which converts the circularly polarized light into a linearly polarized light, the delay element being disposed in front of the divider means.

24. An identifying system according to claim 22, wherein the divider means is selected from the group of a crystal having a dividing interface, a birefringent crystal, and a semitransparent mirror.

25. An identifying system according to claim 22, further comprising an attenuator, wherein after the divider means, one of the two parts passes through the attenuator, wherein analyzer includes a first image surface and a second image surface showing corresponding images of the two parts, and wherein the attenuator is adjusted to be such that points of the first image surface showing a polarized area are brighter than equivalent points on the second image surface after the divider means, while at any other points of the first image surface are less bright than equivalent points on the second image surface.

26. An identifying system according to claim 22, wherein the object to be identified is selected from the group of a numeral, a series of numerals, a letter, a series of letters, a figure, and any combination of these.

27. An identifying system according to claim 22, wherein the object to be identified is a one-dimensional code, the polarizing surface of the marker is disposed in a same line with the code.

28. An identifying system according to claim 20, wherein the object to be identified is a one-dimensional code including a plurality of concentric rings, and the polarizing surface of the marker is disposed in a center of said rings.

29. A method of locating and identifying an ordinarily visible object which is located at an arbitrary location and attitude, comprising the steps of:

providing a marker having a polarizing surface reflecting a polarizing electromagnetic radiation with a wavelength longer or shorter than that of visible light without an aid of a polarizing radiation source, the marker with the polarizing surface being disposed in a vicinity of the ordinarily visible object so that a mutual positioning of the polarizing surface and the ordinarily visible object is known;

observing and analyzing the polarized radiation reflected from the marker so that an existence, location and attitude of the marker is found;

locating the arbitrary location and attitude of the object in the vicinity of the marker based on said mutual positioning; and identifying the object.

30. A method of locating and identifying an ordinarily visible object which is located at an arbitrary location and attitude, comprising the steps of:

providing a marker having a polarizing surface reflecting a polarizing electromagnetic radiation with a wavelength longer or shorter than that of visible light without an aid of a polarizing light source, the marker with the polarizing surface being disposed on the ordinarily visible object;

observing and analyzing the polarized radiation reflected from the marker so that an existence, location and attitude of the marker and the object under the marker is found; and identifying the object.

* * * * *